United States Patent
Pamfiloff

(10) Patent No.: US 9,469,421 B1
(45) Date of Patent: Oct. 18, 2016

(54) ELECTROSTATIC PROCESS TO SHIELD SPACECRAFT AND OCCUPANTS FROM SOLAR WIND AND COSMIC RADIATION

(71) Applicant: Eugene B. Pamfiloff, San Anselmo, CA (US)

(72) Inventor: Eugene B. Pamfiloff, San Anselmo, CA (US)

(*) Notice: Subject to any disclaimer, the term of this patent is extended or adjusted under 35 U.S.C. 154(b) by 0 days.

(21) Appl. No.: 15/090,203

(22) Filed: Apr. 4, 2016

Related U.S. Application Data

(63) Continuation-in-part of application No. 13/999,916, filed on Mar. 31, 2014, now Pat. No. 9,302,792.

(51) Int. Cl.
| | |
|---|---|
| *B64G 1/42* | (2006.01) |
| *G21H 1/02* | (2006.01) |
| *G21H 7/00* | (2006.01) |
| *B64G 1/54* | (2006.01) |
| *B64G 1/44* | (2006.01) |

(52) U.S. Cl.
CPC .. *B64G 1/54* (2013.01); *B64G 1/44* (2013.01)

(58) Field of Classification Search
CPC ........... B64G 1/421; G21H 1/02; G21H 7/00
See application file for complete search history.

(56) References Cited

U.S. PATENT DOCUMENTS

| 9,302,792 B1* | 4/2016 | Pamfiloff ............... B64G 1/421 |
| 2011/0140729 A1* | 6/2011 | Nakamura ........... G01R 31/307 324/762.01 |

* cited by examiner

*Primary Examiner* — Nicole Ippolito
*Assistant Examiner* — Sean Luck
(74) *Attorney, Agent, or Firm* — Steven A. Nielsen; www.NielsenPatents.com

(57) ABSTRACT

The present application is the first pragmatic process capable of shielding spacecraft and occupants from destructive impact and penetration of the crafts' exterior walls by positively charged particles of cosmic rays and solar wind. The technology also protects the craft from internal cascading secondary radiation caused by energetic particles that strike the surface and those that penetrate to the interior. Particles posing the highest level of danger to spacecraft are low and high energy protons, positive ions and few-particle nuclei. Accordingly, a reliable, enduring and safe shielding mechanism for spacecraft has not been available until the development of the present application. The shielding is accomplished by conveying a positive electric charge to the atoms and molecules of the exterior surface. Incoming particles are diverted and deflected from the surface by an established electric field derived through an advanced electric system that utilizes electrons emitted by solar wind as electric energy.

8 Claims, 4 Drawing Sheets

ELECTROSTATIC PROCESS TO SHIELD SPACECRAFT AND OCCUPANTS FROM SOLAR WIND AND COSMIC RADIATION

CROSS-REFERENCE TO RELATED APPLICATION

This is a utility application that is a continuation in part of patent application Ser. No. 13/999,916 filed on Mar. 31, 2014. This related application is incorporated herein by reference and made a part of this application. If any conflict arises between the disclosure of the invention in this utility application and that in the related application, the disclosure in this utility application shall govern. Moreover, the inventor(s) incorporate herein by reference any and all patents, patent applications, and other documents hard copy or electronic, cited or referred to in this application.

FEDERALLY SPONSORED RESEARCH

Not Applicable

SEQUENCE LISTING

Not Applicable

BACKGROUND

This application relates to the field of atomic physics and atomic engineering, particularly to the control of charged particles present within and beyond the heliosphere for the protection and shielding of spacecraft, vehicles, base stations, contents and astronauts from solar wind, cosmic radiation and internal secondary radiation through an efficient and effective process.

PRIOR ART

Currently a small number of methods are available intended for the protection of astronauts, life-support systems and interior instrumentation systems of spacecraft from penetrating and damaging low and high-energy particle bombardment of cosmic rays and solar winds emissions. The particles of primary concern are high-energy protons from solar emissions and cosmic rays. The particles of the solar wind continuously extend outward from the sun in all directions striking everything in the heliosphere. The particles of cosmic radiation come from all over the galaxy from all directions, constantly impacting upon any craft situated above the atmosphere. These particles have sufficient energy to penetrate the exterior walls of spacecraft, space stations, satellites and crafts of every type. The current strategy upon which the protection of humans situated in space environments is based revolves around the concept of blocking particle penetration into the craft's interior spaces. Thus far, since the shielding methods employed were not able to prevent hull penetration, the emphasis shifted to limiting the extent of penetration to special areas of the craft. This entailed the encirclement of vital components and crew quarters from the various types of radiation with a material underlayment. This strategy essentially ignores the piercing of the exterior wall. The blocking material consists of multi-layered wrapping situated commonly beneath a thin aluminum exterior housing that surrounds the craft. Although the wrapping is somewhat effective for the secondary purpose of thermal insulation, it is not very effective against high or low-energy particle impact and penetration or the secondary radiation produced by the latter events. Both those particles that impact upon the surface and those that penetrate the outer wall and into the underlayment produce a cascade of secondary ionizing radiation within the craft that will cause damage to living cells and sensitive instrumentation. The secondary particles are just as damaging as the original particles of the solar wind that pass through the surface of the craft. When a cosmic ray proton strikes an atom or molecule of craft material, the collision causes the incident particles—proton and nucleus—to break apart into a series of subatomic and elementary as well as other particles. These continue to collide with other atoms causing a cascade of ionizing particle radiation inside the craft. The rho, eta, kaon, pion and muon are examples of these elementary particles and the electron and positron are subatomic. This radiation also includes x-rays and gamma rays. That ionizing radiation also causes the breakdown and decomposition of molecules that makeup the materials from which the craft is constructed. The wrappings consist of various brands of plastic sheeting such as polyethylene film, other materials such as beta cloth and reflective films of polyester. Another strategy is to enclose a layer of water ($H_2O$) between the outer and inner enclosures of the crew compartment as a barrier, although it has not as yet been implemented. Since this water is meant for consumption and other purposes, the effectiveness of this insulation is reduced as the liquid is consumed.

The common material used for the exterior housing of spacecraft is thin walled aluminum. This receives the brunt of impacts and is easily penetrated by the high velocity particles. Therefore, the exterior housing and interior wrapping materials experience substantial failure over short periods of time, principally due to the particle penetration and the subsequent cascading ionizing radiation. Furthermore, because the insulating materials are not effective for the protection of astronauts during extended missions, a secure, reliable, innovative and enduring system of shielding is necessary to minimize surface penetration. Such a process is described by the present application.

Although significant advances have occurred with the spacecraft insulation systems described above, little progress has been made to minimize particle penetration. Therefore, each method currently employed has a number of other disadvantages.

Additional disadvantages of prior art:
1. The blocking of impacting particles from entering into vital areas of the craft using sheeting is a haphazard strategy as it does not prevent penetration of the exterior.
2. Particles that are allowed to impact and penetrate the exterior walls invariably lead to material breakdown, deterioration and eventual disintegration of the insulation.
3. Multilayers of plastic sheeting contribute to the production of secondary ionizing radiation within the craft.
4. Because the launch weight of a craft is a significant factor the exterior enclosure must be of the lightest materials available and the thinnest possible that would still maintain structural integrity, thereby relegating interior protection to third place.
5. The water barrier will not prevent particle penetration of the exterior surface.
6. As the water is consumed, the barrier shrinks accordingly allowing ionizing radiation into the compartments.
7. Furthermore, the piercing of the crafts' exterior wall will eventually allow water leakage into space.

8. Impacts by cosmic ray and solar wind particles will cause molecular decomposition and breakdown of atomic bonds of the materials from which the craft is constructed.
9. As can be seen, other than thermal insulation, these systems have very limited success with control of cascading secondary ionizing radiation, with no effect against particle impacts upon the surface and penetration of the crafts' exterior and interior surfaces.

Accordingly, a reliable, enduring and safe shielding mechanism for spacecraft has not been available until the development of the process of the present application.

ADVANTAGES AND SUMMARY

However, the process of the present application overcomes each of the described disadvantages. Furthermore, the subject process does not merely attempt to block energetic particles from penetrating to the interior, it actually prevents the harmful particles from striking the surface of the craft.

As stated above, the particles of primary concern are high-energy protons and the occasional few-particle nuclei and ions that can be part of the cosmic rays and solar wind. The few-particle nuclei include $^2$H, $^3$He, $^4$He and several other small nuclei, where all exhibit positive electric charges.

The present application describes a process by which an electric charge is placed upon the surface, independent segments covering the surface or an extended supplementary surface of the craft sufficient to deflect the positively charged cosmic ray or solar wind particles. The process for deflection of positively charged particles is accomplished by placing a positive electric charge upon the surface components through an advanced electric generation system, as further described herein.

The present application utilizes an advantageous electrical system that provides electric power generation without the expenditure of fossil, chemical or nuclear fuels. It functions without the emission of hazardous materials or substances. Furthermore, it does not contain parts that would experience undue wear or parts that would deteriorate over short periods of use. It reliably, efficiently and economically produces electric energy continuously for the term of the voyage or mission, and where there was any production in excess of immediate needs, it could be stored for future use. And since the power generation is fueled by something other than those constantly diminishing supplies needed by conventional devices to generate electricity, these features make it the most practical of systems for all manned or unmanned spacecraft in orbit or those underway throughout and beyond the solar system. The technology derived makes practical such independent power generation systems for use in large and small scale applications for satellites and manned craft and for short and long term voyages.

The electric generation system can be scaled to accommodate the energy requirements of most implementations, whether small communications satellites, manned space stations, or spacecraft of every type. For the production of electric energy on a large scale, the described system represents the first pragmatic technology to emerge for this purpose that takes advantage of the plasma consisting primarily of protons and electrons incessantly emitted from a star.

The electric generation system is fueled by the seizure of certain charged particles comprising the solar wind. And once the system is fully energized, it requires only an infrequent enhancement to sustain operation. The electrical system is further explained below.

As previously indicated, the electric generating capabilities of the system can be used as independent power generation units for every type of spacecraft, irrespective of the direction or duration of the planned mission. Furthermore, the electric generation system is ideal to power roving vehicles or fixed installations, facilities or bases located on planets or moons with little or no atmosphere such as our moon, several of the moons of Jupiter or Saturn, or the planets Mercury and Mars.

DESCRIPTION OF THE PROCESS

The process of the present application deflects positively charged particles and nuclei away from the surface and areas of the craft in need of protection through a suitable electric generating system capable of providing the necessary energy.

The electric system that powers the process of the present application is described in the following paragraphs. The electric system differs substantially from the prior art, as it facilitates the production of electric energy by the targeting and seizure of beta-minus particles and electrons, representing two of the many emitted from the array of particles that comprise solar wind radiation. Solar wind provides a continuous stream of charged particles that are ingredients of the plasma emitted through the sun's corona. This is common to all active stars. The charged particles consist primarily of protons, conventional electrons and beta-minus particles. The solar wind permeates the area to form a discernible boundary at the edge of the space surrounding the solar system called the heliosphere, which is situated at a point where the pressures are equal to that of the interstellar medium. That boundary is located far beyond the rock called Pluto.

Since the electric generation system involves the attraction and seizure of beta-minus particles and electrons being constituents of solar wind, a discussion of those particles is presented. Particles that make up the solar wind are continuously emitted in all directions from the surface of active stars. The majority of the radiation in terms of particles with mass consists of protons, the positively charged particles, with beta-minus and electrons representing negatively charged particles. Some of the protons are the nuclei of hydrogen or artifacts of heavier atoms, while others are the products of neutron decay. A small part of the radiation consists of heavier intact nuclei, less their electrons, such as $^2$H, $^3$He, $^4$He ions, and occasionally even heavier nuclei. Also present in the radiation are beta-plus particles (positrons), neutrinos, including x-ray and gamma ray photons and other electromagnetic radiation (EMR). Because there are in fact two different sources of electrons that comprise solar radiation, they are identified as indicated below.

Even though beta-minus particles are identical to electrons, they have a different source than the conventional electrons present in the stream of solar radiation. Conventional electrons are those that orbit the nucleus of every atom, their number being equal to the number of protons that identify the atom. Concerning the beta-minus particles, the sun attracts atoms and molecules through the gravitational force. Upon entry into the star, their electrons are knocked away from the atom by repulsion of like-charges, the thermal energy (high temperatures) and the constant collisions taking place with photons of various energies. However, the beta-minus particles are products of neutron decay. Just as the thermal energy and the constant collisions influence orbiting electrons to breakaway, so are compound nuclei that contain a mix of protons and neutrons encouraged to disassemble. Nearly all such compound nuclei are broken down into individual protons and neutrons. However, once freed, the neutrons demonstrate instability and each decays by the emission of a beta-minus particle while producing a proton. For example, when a single iron atom falls into a star, the $^{56}$Fe isotope consisting of 26 protons, 30 neutrons and 26 conventional electrons begins to decompose. First the 26 orbiting electrons are freed, and then the nucleus breaks apart into individual protons and neutrons. But, the unstable neutrons decay further by the emission of beta-minus particles, providing 30 additional protons for a total of 56 and the 30 beta-minus particles bring the total of electrons to 56. During a free neutron decay mode, other particles are simultaneously emitted from each particle, including an antineutrino, gamma ray photon and additional mass is liberated. Furthermore, the hydrogen and helium atoms that were attracted to the star contained equal numbers of electrons and protons. And every neutron that was present added an extra electron and proton to the plasma. As can be seen, electron emissions as part of solar wind radiation must be equal to or slightly exceed the number of protons. Hence, at any point of the spherical space that encompasses the volume of the heliosphere, negative charges are approximately equal to the presence of positive charges. These electrons and protons make up the primary particles of solar wind radiation.

The electric generation system described herein has been developed for the seizure and utilization of the available electrons at any point in space as electric energy for the benefit of spacecraft.

This system that takes advantage of these abundant solar electrons is further described herein. It is known that exposing the plates of a parallel plate capacitor to an electric potential difference will establish a charge upon them equal to the potential. This involves the removal of electrons from the neutral atoms of one plate with the transfer and placement of those electrons onto the opposite plate. Consequently, one plate becomes positively charged due to the shortage of electrons and the other plate becomes negatively charged due to the surplus electrons. Furthermore, when a parallel plate capacitor is charged as previously described and subsequently isolated, it can retain its effective electric charges for extended periods of many days, months or even years without substantial degradation. It follows that the positive and negative electric fields produced by such a capacitor will likewise persist for extended periods or until the capacitor is purposely discharged.

This is one of the principles by which the process of the present application functions while utilizing the described electric system. The process involves a charge segregation and storage assembly by which the negative and positive charges of atoms and molecules of the material can be separated, stored and if necessary, isolated. This entails the removal of electrons from one component with the placement of those electrons on another component. It is also understood that a system described in the present application will contain one or more charge segregation and storage assemblies or as many as may be required by an embodiment or utilization.

Since the beta-minus particles and electrons of the solar wind radiation are already free particles, it is not necessary to stimulate or excite the particles, as would be necessary with conventional orbiting electrons held in place as a result of electron binding energy. It is an energy efficient system for the seizure and control of free electrons for the production of electricity and other purposes to which the system may be applied. A modification of the system allows the deflection of positively charged particles. These results are accomplished while the craft moves through the medium of solar radiation, where it attracts and retains the beta-minus particles and electrons from the emitted plasma through associated electric fields and by electrically charged components upon contact.

By making the surface of the craft or portions thereof the positive plate of the charge segregation and storage assembly, it will attract and seize electrons upon contact and at the same time deflect positively charged particles and nuclei. Thus, it needs to be fashioned from a suitable material such as the already in use aluminum or other worthy conductor. Exposing the positive plate to the solar medium, incoming positive charges are diverted, repelled and deflected form their original trajectory.

Even though the present systems might have the capability, it is not necessary to repel the positively charged cosmic ray and solar wind particles back towards the point of origin. The objective here, requiring much less energy, actually only a fraction thereof, is to deflect the incoming positive charges away from the surface of the craft. With 3 valance electrons removed from each aluminum atom of the exterior enclosure, it can be seen that a single cosmic ray proton or a positively charged nucleus approaching the surface of the craft is met by an opposing electric field and a wall of positive electric charges with a +3 charge per atom. Deflection of the incoming particle is unavoidable.

The magnitude of the positive electric charge of the proton is exactly equal to the magnitude of the negative electric charge of electron. The proton carries a charge of $+1.602\times10^{-19}$ C while the electron carries of charge of $-1.602\times10^{-19}$ C.

The electric system is superior to any other intended for the utilization of beta-minus particles and electrons contained in solar emissions. It simplifies every application, implementation or utilization, because as the free electrons are seized from the medium they provide a continuous supply of electric energy. Additionally, it is extremely efficient, in that once the system is fully charged thereafter it requires only an occasional replenishment of energy to sustain operation. These are important features for any utilization intended for the production of electric energy and with specific application, provide for the deflection of positively charged particles.

Regardless of the crafts' location within the heliosphere, the solar wind radiation is always moving towards it. By placing a positively charged receiver terminal or similar component on the exterior of the craft, all nearby electrons and beta-minus particles will be attracted to it and seized upon contact. Simultaneously, the positive component will deflect protons, positive ions and nuclei from the surface of the craft. Meanwhile, the seized electrons are subsequently sequestered by other components and made available for distribution to various electric devices throughout the craft.

Embodiments of the electric systems contain conductive components, which include but are not limited to attraction, interception and electron sequestration components. Shown in FIG. 1A is part 4 identified as the positive field plate representing one of the components responsible for the attraction and interception of electrons from the external solar wind radiation source. Here also shown is part 12 identified as the electron isolation plate terminal to which a positive charge has been conveyed through induction by component part 10. In addition to the sequestration of the captured electrons, part 12 also contributes to their attraction and transfer from 4. Embodiments may contain any quantity of each of these components; although the actual number of each is determined by the requirements of the utilization.

On occasion, the beta-minus particles and electrons that are subject to capture will be referred to collectively as the object particles, while protons and positive ions are referred to as target particles. Furthermore, the charged components dedicated to the capture of the electrons will also be referred to as the electron interception terminal or receiver plate, subject to its position in the circuit. Both the electron interception terminal and receiver plate can also function as the deflection plate. The components may be constructed of various conductive materials and in various geometrical configurations, sizes, shapes, arrangements, and quantities.

The charged electron interception terminal can be configured into many forms, where some could take the form of a grid, pane, panel, or plate. Throughout this application the term "grid" will be used to represent a variety of attraction and apprehension or deflection components as may comprise certain embodiments that include but are not limited to the use of screens, lattices, nets, webs, gridirons, gratings, trellises, grills, grids or similar components, or any combination thereof. And the term "pane" will be used to represent a variety of attraction and apprehension or deflection components as may comprise certain additional embodiments that include but are not limited to the use of sectioned or perforated panels, sheets, foil, disks, bars, rods, shafts, tubes, cones, plates, panes or similar components, or any combination thereof. And the term "panel" will be used to represent a variety of attraction and apprehension or deflection components as may comprise certain additional embodiments that include but are not limited to the use of an assembly of non-perforated, sheets, foil, disks, bars, rods, shafts, tubes, cones, plates, panes, or similar components or any combination thereof. Furthermore, an embodiment may contain any combination of grids, panes, panels or other varieties of components such as plates. The grid, pane, panel and plate type components are defined in greater detail below.

The primary difference between the electron interception component types relates to the method of their utilization and the quantity of energy required by the facility or craft. The grid type consists of a conductive material containing mesh openings through which the object particles can enter. Whereas the pane type consists of a sheet or sheets of solid conductive material containing perforations of various configurations through which the particles can enter. And the panel type consists of an assembly of multiple individual non-perforated conductive sheets arranged with gaps in between where along the surface of which the particles can pass. The plate type consists of one or more charged plates arrange to intercept the object particles. The primary objective is to expose the object particles to the charged surfaces of the various types and if required, to enhance the probability of contact. Some interception types as may be used within certain embodiments may be interchangeable and take a multitude of forms that are not specifically described herein, subject to the requirements of the implementation.

As previously stated, the interception components as well as other components may take many forms and can be manufactured from different conductive materials or in some applications, from semiconductors, nanoparticles or ceramic compositions and various assemblages thereof. Certain metals and oxides thereof and various alloys and compounds thereof can also be used in some utilizations. The actual materials, geometrical configurations, sizes, shapes, arrangements, and quantities of all components of a system are determined by the specific utilization.

Furthermore, the electron interceptor type and other components may be shaped to conform to the shape of adjoining components or the surrounding container or environment into which they are placed. Multiple interceptors, if utilized, are operated individually, as a group or as many groups as are necessary. However, when single or multiple interception components are part of an assembly containing a positive field plate or as applicable, include a negative field plate, they will be referred to collectively as the electron interception assembly (EIA) of a type subject to the embodiment or of each specific implementation.

A positive electric charge is placed upon one component of the electron attraction and interception assembly and to any components attached thereto, in reference to the positive field plate 4. Specifically, through the precise control of the electric potential difference, a charge is conveyed to a percentage of the atoms of the conductive material by the removal of their valance electrons. For example, if 50 percent of the atoms are encouraged to give up one electron to another component, the resultant positive charges will distribute evenly throughout the surface of the material. It is not that the positively charged protons distribute, but that the remaining valance electrons will distribute across the surface of the material leaving positively charged holes evenly distributed. However, a +1 or greater net charge per atom can also be placed on the material, indicating the removal of one or more valence electrons from each atom of the positive field plate 4. The material from which the positive field plate is constructed determines the number of available valance electrons each atom has; as an example, aluminum has three per atom. By the influence of a sufficient electric potential difference applied during the initial system charging phase, all valance electrons could be transferred from plate 4 to plate 6. If the component were made of aluminum, this interaction would leave three positive holes situated with each atom or a +3 charge per atom throughout the material. When necessary, the process provides other methods to reproduce these or similar results.

The now positively charged atoms will extend the positive charge to connected components such as an externally placed electron interception terminal, which is exposed to the medium permeated by beta-minus and conventional electrons. Thus, electrons will be continuously attracted to the terminal and apprehended from the medium upon contact thereto. FIG. 1A shows that the positive field plate 4 can be exposed directly to the medium as the primary interception terminal; however, a variety of attachments to part 4 can also be utilized as the component exposed to the medium to apprehend the electrons or to deflect protons. One variation of this configuration is shown in FIG. 2A.

Summarizing the previous discussion, because the number of valance electrons is known and varies with different materials, within certain limits the net average charge per atom of the positive field plate 4 can be controlled. And since the positive field plate, by its location, can be utilized as the primary electron interception terminal, an unprecedented array of energy becomes available to the craft. The amount of energy collected from the medium can be controlled through computer monitoring or even by adjustment of the surface area of the electron interception terminal. As stated above, with some embodiments another component can become the primary electron interception and proton deflection terminal, as detailed later.

Although the principal component shown in FIG. 1A and discussed herein is a single charge segregation and storage assembly comprising components 4 and 6, it should be noted that multilayered or multiple units may be used in various implementations. Similarly, the charge isolation and sequestration assembly comprising components 10 and 12 could also consist of multilayered or multiple units that may be used in various implementations.

Moreover, by the strict control of the variables described herein, including the average net positive charge per atom placed upon the positive field plate 4 and the induction plate 10, a continuous stream of electrons can be captured from the medium. This has far reaching consequences, as subsequently described.

The required net positive charge is applied to the attraction component, the positive field plate 4, by the electric potential difference of the power source 2. Through the power source, during the initial system charging phase, electrons are removed from the positive field plate 4 and are transferred to the negative field plate 6. The electrons are prevented from escaping the negative field plate by a valve 20. And since the negative field plate is now fully charged to specifications and isolated from the positive field plate and the environment, the resultant electric fields will persist for an extended period of time, requiring thereafter only infrequent replenishment of energy. Once the required quantity of electrons has been removed and transferred to the negative field plate 6 the power source 2 can be shut down.

The principle by which the various charged systems function is directly correlated to a series of electric fields specifically imposed upon the principal components. In reference to FIG. 1A, the first is the positive electric field placed upon field plate 4. The second is the negative electric field placed upon field plate 6. The third is the positive field placed upon the induction plate 10. The fourth is a negative field induced upon the facing front surface of isolation plate 12. The fifth is the positive field induced upon the backside of isolation plate 12. The subject process relies upon the energy stored within the five electric fields described above. However, certain embodiments or utilizations may require additional principal components onto which electric fields must be imposed or induced. The minor electric fields known to be produced by all electric parts and conductors in the presences of an electric current or changing magnetic field are not the subject of this paragraph.

Through connection to field plate 4, a positive charge can be conveyed to an attached accessory such as the receiver plate 18 or the surface 30 of a spacecraft, in the event that it becomes a component of a specific embodiment. This condition is shown in FIG. 2A. When placing a positively charged terminal, on the surface of the craft, nearby electrons will be attracted to it and seized upon contact. Immediately upon seizure the electrons are transferred to plate 4, freeing the positive charges on plate 18 or surface 30. As the electrons move up the conductor from terminal plate 18 and approach the positive field plate 4, they are prevented from returning to the medium by a valve 28. The now captured electrons situated on plate 4 are simultaneously attracted by the positive holes situated on the electron isolation plate 12 and transfer thereto.

Previously, during the initial system charging phase, as the electrons transferred from the atoms of positive field plate 4 to the negative field plate 6, strong electric fields were established upon each plate. When charging was complete, the power source shut off or went on standby. Through the electric fields, each plate maintains a constant influence on its counterpart. Assuming that not all valance electrons were initially removed, the negative field plate 6 continues to repel many of the remaining valance electrons still held by the atoms of the positive field plate 4. These repelled valance electrons have no place to go except to the electron isolation plate 12 by attraction to the positive holes established there. The path to the isolation plate 12 is clearly the path of least resistance, as compared to any other location, including the medium. Through an induced positive electric charge placed upon the component 12, those remaining valance electrons are attracted and isolated and their return to the field plate 4 is prevented by the valve 22. The quantity of remaining valance electrons and those actually transferring from the positive field plate 4 to the isolation plate 12 is subject to the strength of the electric field initially established upon the negative field plate 6 and the ionization potential of those remaining valance electrons. As previously indicated, since electric charges will accumulate upon the facing surface of each plate, it is useful to remove sufficient electrons from the positive field plate and any attachment thereto in reference to receiver plate 18, surface 30 or other components, so as to establish a positive charge to both the field plate and attachments.

The following discussion is in reference to an attachment to the positive field plate 4. One type of attachment is shown in FIG. 2A. The electrons previously captured from the medium were simultaneously attracted by the attached receiver plate 18, the positive field plate 4 and the positive charge of the isolation plate 12. As the captured electrons advance towards the positive field plate 4, they are concurrently attracted by the positive holes in the isolation plate 12. Since the captured electrons are now treated as the previously repelled valance electrons, they must follow the same course and accumulate upon the isolation plate 12, where they become available as electricity. In FIG. 2A, the receiver plate 18 is shown connected to the crafts' surface, part 30. However, a connecting terminal with valve 28 could be attached directly from plate 4 to the surface 30, where electrons would be removed from the conducting surface and transferred to plate 12. This embodiment is shown in FIG. 3A.

FIGS. 1A through 4A show that the isolation plate 12 also connects to the negative terminal 32 to which the electrical system of the craft is connected. The figures demonstrate the feasibility of utilizing a positive ground terminal 34 with certain embodiments. Part of this electrical system could include electric storage devices such as batteries, an inverter or many other devices, subject to the implementation. It should be understood that in addition to batteries, there are many types of electric storage devices available. In an alternate embodiment an inverter could follow the electric storage device in a circuit or vice versa.

The electron isolation assembly (EIA) consists primarily of three types of components that include the following: The induction plate 10, carries a positive electric charge. This charge was placed there during the initial system charging phase through the power source 2 or through another power source. That while electrons were being transferred from the positive field plate 4 to the negative field plate 6 they were simultaneously removed and transferred from the atoms of the positive induction plate 10. Just as with the charge placed upon the positive field plate 4, the charge placed upon the positive induction plate 10 is also controlled by the net average charge per atom. This means that the strength of all three electric fields that pertain to the electron isolation assembly can be controlled over a wide range. Once the charge is established on the positive induction plate 10, it influences certain interactions within the isolation plate 12. Due to the proximity of one plate to the other, the positive induction plate attracts electrons to the surface of the isolation plate 12 in numbers corresponding to those removed from plate 10. Because the valance electrons of the atoms within the isolation plate have accumulated on the facing surface section, this action induces a strong positive electric charge on the back section or backside of the plate, leaving a positive hole for every displaced electron. It is that induced positive charge on the back section of the isolation plate which contributes to the attraction and draws captured electrons to it. They are attracted to plate 12 and subsequently isolated by the valve 22. In simpler terms, the positive charge placed on induction plate 10 attracts electrons to the surface of the facing isolation plate 12, which in turn induces a positive charge on the backside of plate 12. Since the positive induction plate 10 is charged and thereafter isolated, it maintains its charge for an indefinite period, requiring only infrequent replenishment.

For some embodiments it might be advantageous to utilize an alternate system of induction upon the electron isolation plate 12. By employing a negative electric charge on the induction plate 10 rather than the positive previously described, the interactions between the electric charges on plate 12 would be different. Here, the negative charge of plate 10 would repel valance electrons from the facing surface of plate 12 leaving positive holes there in numbers corresponding to those repelled.

When a component requires replenishment of its electric charge, it is done as previously described or through secondary circuits, not shown as part of the primary circuits contained in the FIGS. 1A, 2A, 3A and 4A, or as further described herein.

The effect of the induced charge on one component by the electric field of another component, as described above, can be reproduced by other methods that include but are not limited to other types of components and energy applications that include AC current, magnets, electromagnets, or other electromagnetic devices and principles or a combination thereof. In other embodiments, a strong magnetic field will have a similar effect with respect to placing a net charge on a component. Likewise, in another embodiment a combination of electric and magnetic fields can be applied for this purpose.

Therefore, once the principal components are properly charged, as during the initial system charging phase and with the negative field plate 6 and the positive induction plate 10 properly isolated, thereafter they will require only infrequent replenishment to maintain the effectiveness of the system operation. The electric energy that accumulates on the isolation plate or multiple plates thereof is thus available as electricity, to be used as initially available, stored or changed to the required form and then utilized as needed.

As can be seen, the present process is innovative in the attraction, seizure and isolation of electrons available throughout the space comprising the heliosphere and into the intergalactic medium for the production of electric energy for spacecraft, vehicles or bases situated above and beyond the planet's atmosphere, thus demonstrating its superiority to every prior art. When the system connects to the crafts' exterior wall it deflects positively charged protons, ions and nuclei of cosmic ray and solar wind radiation and it prevents the cascading ionizing radiation within the craft.

DRAWINGS

Figures

Described below are representations of several basic embodiments for which the designations are not indicative of any specific order or preference over any other embodiment. In the drawings, closely related figures have the same alphabetic suffix but different numbers.

Figure 1A:
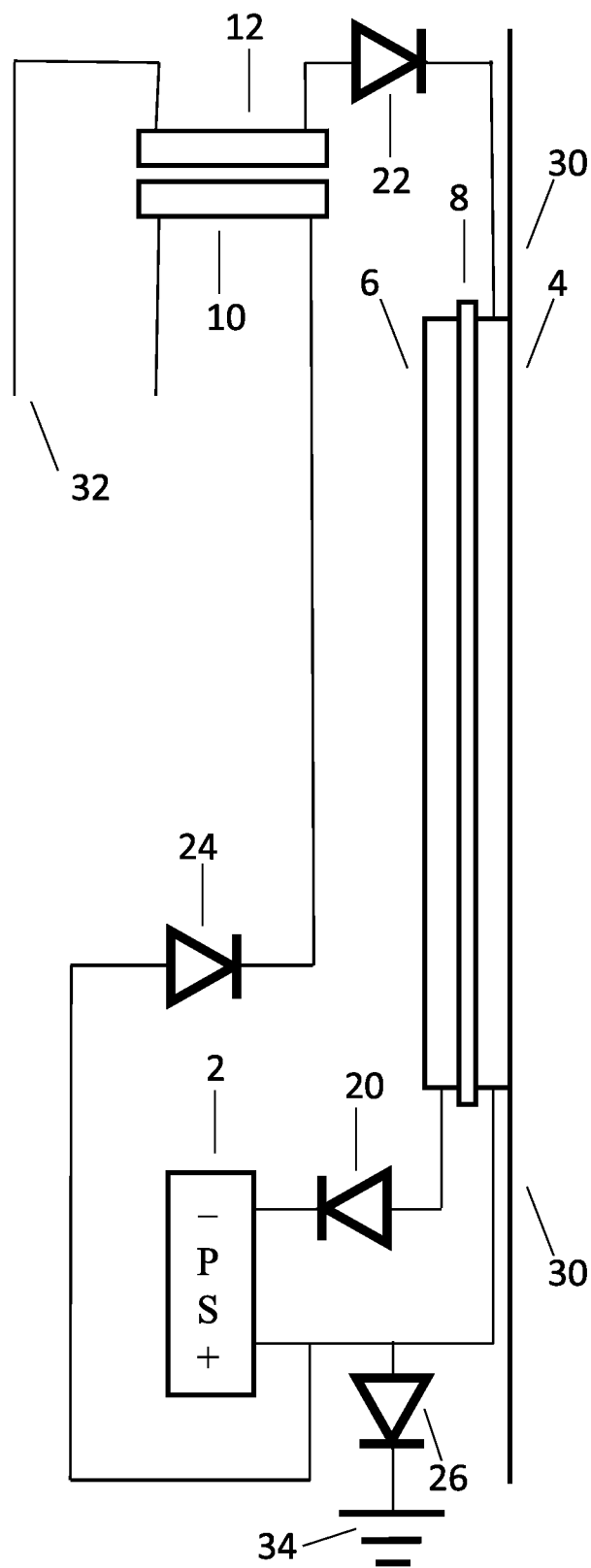
FIG. 1A shows one variation of an embodiment containing a positive ground terminal, with a field plate 4 as the primary electron interception terminal, wherewith electrons are seized, guided through a valve and directed to the electron isolation assembly. This embodiment contains four valves, which allow electrons to move in the required direction that also prevent their return.

The figures described above are for purposes of explanation of the process and are not drawn to any relative or absolute scale. Furthermore, the actual size, shape, design and quantity of parts and components are not absolute but rather are subject to the requirements of the utilization or implementation.

DRAWINGS

Reference Numerals

2. Power source
4. Positive field plate/Interception terminal (can function as deflection terminal)
6. Negative field plate
8. Dielectric/gap
9. Negative induction plate
10. Positive induction plate
12. Electron isolation plate
18. Electron receiver plate/deflection terminal
19. Valve assembly, represented by a Diode
20. Valve assembly, represented by a Diode
22. Valve assembly, represented by a Diode
24. Valve assembly, represented by a Diode
26. Valve assembly, represented by a diode
28. Valve assembly, represented by a Diode
30. Exterior wall/deflection surface-terminal
32. Negative terminal
34. Positive ground

DETAILED DESCRIPTION

FIGS. 1A, 2A, 3A and 4A—Variations of Embodiments

DESCRIPTION

FIG. 1A

FIG. 1A shows one variation of the basic components of an embodiment coupled with a schematic diagram indicating their relative position within an electronic circuit. The components include a power source 2, with the negative terminal connected to the negative field plate 6, while the positive terminal is connected to the positive field plate 4.

The parts 6 and 4 are in fact the negative and positive plates of a charge segregation and storage assembly, respectively.

As shown, the positive field plate 4 is connected to the power source 2 and through valve 20 to the negative field plate 6. The valve isolates the transferred electrons on the negative field plate 6 and prevents the return of electrons to the positive field plate and other components. All valves shown are represented by diodes although other types of valves can be used. The positive induction plate 10 also connects to the power source 2. Just as with the positive field plate 4, when the power source is activated, electrons are removed from the positive induction plate 10 and transferred to the negative field plate 6. The positive charge established there on plate 10 initiates a series of events that take place within the opposite electron isolation plate 12. The interactions establish positive holes throughout the latter side of plate 12. These events contribute to the attraction, capture and isolation of solar electrons. Although a single isolation assembly is shown consisting of parts 10 and 12, it is representative of a group consisting of any quantity that may be required by an implementation. The electrons attracted to and consolidated on the backside of the isolation plate 12 can now be distributed as electricity to many devices directly or put to use as may be necessary within spacecraft. This figure also demonstrates a negative terminal 32, which connects to the crafts' electrical system. Subject to the implementation, a terminal is added at a convenient location to complete the circuit. These configurations could be arranged differently or reversed in some embodiments. In this embodiment the positive field plate 4 functions as the primary electron interception terminal located at a convenient position on or within the craft so as to attract and seize electrons of the medium. Subject to its position in or on the craft, field plate 4 also functions and the proton deflector, which diverts and deflects incoming positively charged cosmic ray and solar wind particles. This figure includes a ground terminal 34 and valve 26, which prevents the return of electrons to ground.

OPERATION

FIG. 1A

During the charging phase of a charge segregation and storage assembly connected to a power source, electrons will move from the positive field plate 4 and accumulate upon the negative field plate 6. These electrons that are easily moved about are the valance or outer most electrons in the atoms comprising the positive field plate material. Likewise, here in FIG. 1A, the process involves an electric potential difference to be applied upon the conductive field plates, parts 4 and 6. The atoms of the positive field plate 4 experience a loss of electrons leaving positively charged holes behind that produce a positive electric field, with all holes having a predisposition for replacement electrons. Simultaneously those electrons accumulated upon the negative field plate 6 produce a negative electric field that maintains a constant influence upon the electrons remaining on the positive field plate 4. This influence extends not just to the remaining valance electrons present in the material, but also to the subsequent seized electrons. Nevertheless, these interactions create positive holes throughout the field plate 4 to which electrons from external sources are attracted. However, positively charged holes of the field plate 4 do more than just attract electrons from the medium, they also contribute to the seizure and confinement of the electrons. During the initial system charging phase, as the valance electrons are being evacuated from the field plate 4, they are also being evacuated from the positive induction plate 10. The positive charges on the surface of the induction plate 10 attract electrons of the atoms of the facing isolation plate 12 to its surface placing a negative charge there, thereby inducing a positive charge on the backside of the isolation plate 12 leaving a positive hole for every displaced electron. The electrons of the medium are simultaneously attracted by the positive holes that permeate the isolation plate 12 causing them to move through valve 22, where they are prevented from returning to field plate 4 or the medium. These interactions establish a continuous flow of electrons from the medium to the craft's electrical system. Considering that the electron isolation assembly represents any number that may be required, a substantial quantity of energy can amass over very short periods of time. The energy is thus immediately and directly available for use in a variety of applications. As can be seen, by maintaining the respective electric charge upon the negative field plate 6 and the positive induction plate 10 and exposing the interception terminal 4 of the embodiment to the medium, a continuous supply of electric energy is produced and made ready for use by all onboard systems. Furthermore, by connecting the field plate 4 to the crafts' exterior surface 30, as shown, electrons are removed from the material and transferred to plate 12. This establishes a positive electric charge on the surface 30 that deflects incoming positively charged particles of the medium.

Initially, the valance electrons of the field plate 4 move through the power source 2, continue through valve 20 and to the negative field plate 6. This persists until the predetermined quantity of electrons has transferred to field plate 6. At the same time, electrons are removed from the induction plate 10, which are also transferred to the negative field plate 6 or to another component that is not shown. Then the power source 2 responds accordingly by shutting down or entering into a standby state. These events place positive charges throughout components 4 and 10, with the number of positive charges on each component being adjustable over a wide range, as previously demonstrated. With the surface 30 of the craft connected to field plate 4, electrons are also removed and transferred therefrom.

As an example, if a +1 charge per atom is placed upon the induction plate 10, in response, up to one electron per atom will gather on the surface of the opposing isolation plate 12. This leaves the back side of plate 12 with a substantial deficit of electrons equating to an average of one positive hole per atom. These positive holes assist in the attraction and seizure of solar electrons and conclude with their isolation. In another example, subject to the electron configuration of the conducting material and the electron ionization potential thereof, if a +3 charge per atom is placed on plate 10, then up to three electrons per atom will gather on the surface of plate 12 leaving three positive holes per atom behind.

Since the subject concerns the transfer of electrons from one position to another, a discussion pertaining to valance electrons is provided. Conventional electrons that orbit an atom are held in orbit by electrostatic charges within a system designated as the ionization potential having an associated value called the electron binding energy. The attributed values denote the amount of energy necessary to remove each electron. Atoms of different elements have different values of binding energy for each electron in order of its position surrounding the nucleus. The outermost electron will have the lowest energy requirement while the inner most will have the highest. Typically, metals that are good conductors have the lowest binding energy for the outermost electrons. Those that are easily moved about are the outer shell valance electrons that also take part in chemical bonds. Furthermore, as previously stated, depending on their electron configuration, certain metals carry more than one valance electron.

After the initial system charging phase, some of the remaining valance electrons and the subsequent captured electrons will move from plate 4 through valve 22 and accumulate on the backside of the electron isolation plate 12 or group thereof. Those remaining valance and the captured electrons are attracted to the isolation plate 12 by the strong positive charge induced upon the backside of the plate. At this point, the power source 2 remains off or in standby to replenish the charge on the negative field plate 6 when and if necessary. The circuit activates only if the charge on the field plate 6 should degrade, whereby the electric energy will be supplied from the subsequent captured electrons through the field plate 4 or supplied through other components such as the isolation plate 12 or as described in subsequent sections through dedicated circuitry, subject to the implementation.

After the power source 2 has shut off, the quantity of subsequently repelled valance electrons is regulated by the strength of the electric field placed upon the field plate 6. Due, in part, to the expelling valance electrons nearest the negative field plate 6, subsequent electrons of the atoms of field plate 4 are repelled, while simultaneously being attracted to the isolation plate 12. These events leave a strong positive charge throughout the field plate 4 and set into motion the continuous flow of electrons to plate 12. The valance electrons are prevented from returning to the field plate 4 by the valves 20 and 22. Furthermore, valve 20 isolates field plate 6 and valve 24 isolates plate 10. Once the field plates 4 and 6 are charged, energy consumption by the power source 2 reduces substantially to a negligible quantity or to zero. Thereafter, energy will be applied infrequently and only if the charge on the negative field plate 6 should degrade. To prevent discharge and degradation of the negative electric field on plate 6, it is typically isolated from the ambient environment, subject to the specific utilization. The field plate 6 is also isolated from field plate 4 with either a sufficient gap or with a minimal and suitable nonconductive barrier, dielectric 8, for example, or both. But nevertheless, to maximize the effect of the negative electric field thereof the two components, 4 and 6, are placed as close as necessary to each other. The positive field plate 4 is now poised to attract and seize from the medium a constant supply of solar electrons and to deflect positive charges. These events cause a continuous flow of electrons from field plate 4 to isolation plate 12 and from it to the electrical system of the craft.

Also shown in FIG. 1A and applicable thereto is component 30 identified as the exterior wall or deflection surface of the craft, station or vehicle to which the system is attached. In this figure, the positive field plate 4 represents the electron interception terminal shown to be flush with the craft exterior. It should be understood that this is showing only one of many positions to which the interception terminal could be placed on or within the craft. The final position and arrangement of the interception terminal in relation to the exterior wall 30 is determined by the design and configuration of the craft or other utilization.

The electrical system of the craft is connected between terminal 32 that attaches to plate 12 and the ground terminal 34, which is protected by valve 26. As has been demonstrated throughout this application, the positive charge of the deflection surface 30 is continuously maintained, because the electrons captured from the medium are attracted by and immediately transfer to plate 12 and the crafts' electrical system.

DESCRIPTION

FIG. 2A

Figure 2A:
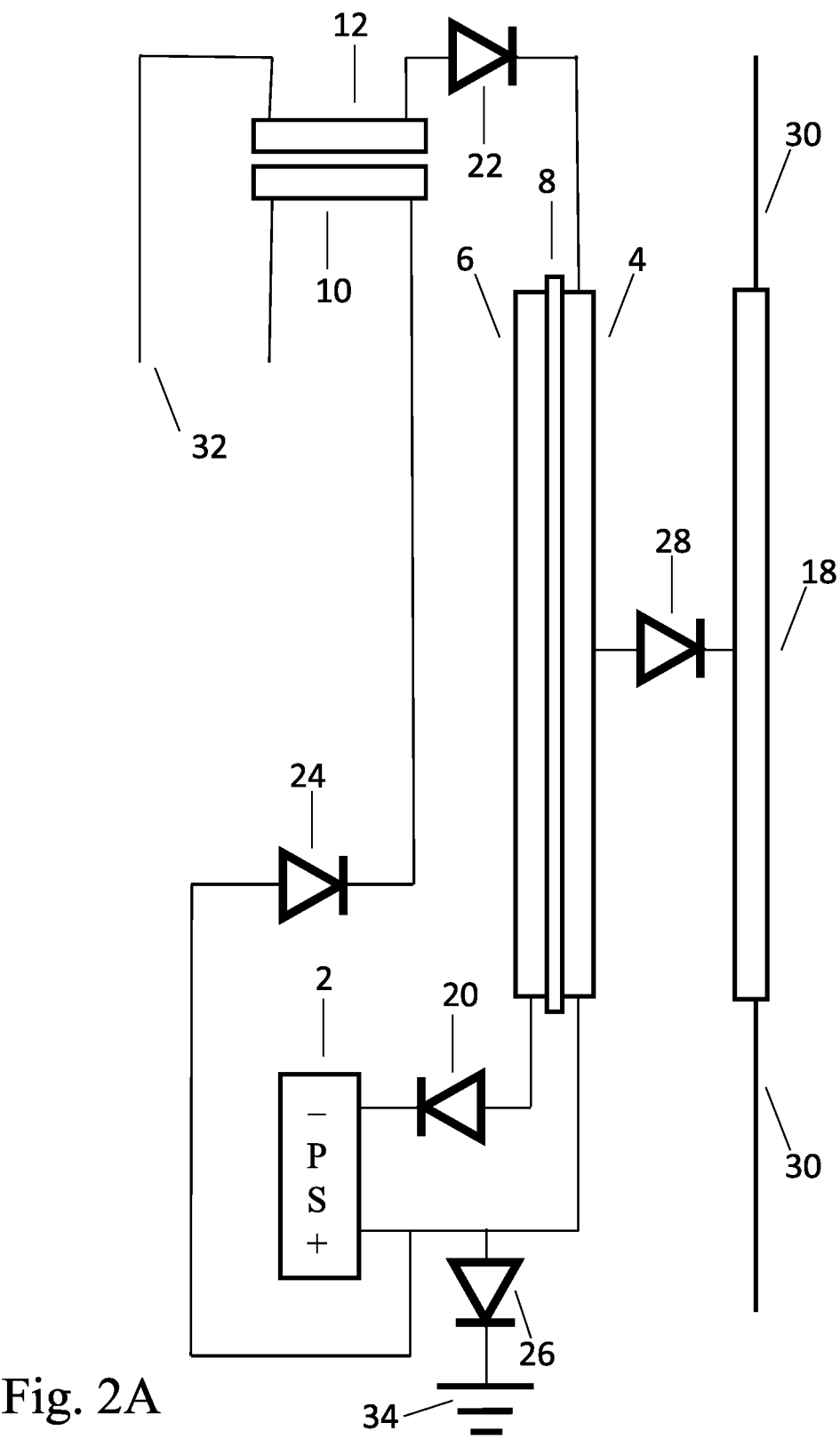
FIG. 2A shows another variation of an embodiment containing an alternate electron interception and deflection terminal consisting of an attached receiver plate 18 with an adjoining fifth valve.

FIG. 2A shows a variation of the basic components of an embodiment coupled with a schematic diagram indicating their relative position within an electronic circuit. The components include a power source 2 with the negative terminal connected to the negative field plate 6, while the positive terminal is connected to the positive field plate 4. The parts 6 and 4 are in fact the negative and positive plates of a charge segregation and storage assembly, respectively. This figure differs from the previous by the inclusion of an electron receiver plate 18, which functions as the electron interception terminal. The receiver plate 18 is exposed to the medium rather than the positive field plate 4 allowing it to also function as the deflection terminal. It connects to field plate 4 through valve 28.

As shown, the positive field plate 4 is connected to the power source 2 and through valve 20 to the negative field plate 6. The valve 20 isolates the transferred electrons on the negative field plate 6 and prevents the return of electrons to the positive field plate 4 and other components. All valves shown are represented by diodes although other types of valves can be used. The positive induction plate 10 also connects to the power source 2. Just as with the positive field plate 4, when the power source is activated, electrons are removed from the positive induction plate 10 and transferred to the negative field plate 6. The positive charge established there on plate 10 initiates a series of events that take place within the opposite electron isolation plate 12. This relationship establishes positive holes throughout the latter side of plate 12. Although a single electron isolation assembly is shown consisting of parts 10 and 12, it is representative of a group consisting of any quantity that may be required by an implementation. The electrons attracted to and consolidated on the backside of the isolation plate 12 can now be distributed to many devices directly or put to use as may be necessary throughout the spacecraft. This figure also demonstrates a negative terminal 32, which connects to the craft's electrical system. The positive ground 34 is also shown here connected through valve 26. In this embodiment the positive field plate 4 no longer functions as the primary electron interception terminal. This function has been transferred to the electron receiver plate 18 as the primary interception terminal. Through valve 28, the field plate 4 and receiver plate 18 are connected. The receiver plate 18 is located at a convenient position on or within the craft so as to be exposed to the medium to attract and seize free electrons. This figure differs from the previous by the addition of the receiver plate 18 and valve 28, which prevents the return of electrons to plate 18 and the medium.

OPERATION

FIG. 2A

The basic operation of FIG. 2A is similar as that of the previous figures. From the perspective shown, electrons are removed from field plate 4 through the power source 2 and transferred to field plate 6. However, in this embodiment field plate 4 no longer functions as the electron interception terminal. This responsibility has been transferred to the electron receiver plate 18 by which free electrons from the medium source will be attracted and seized. With the receiver plate 18 connected through valve 28 to the positive field plate 4, resident valance electrons are removed from plate 18, transferred to field plate 4 and then to field plate 6. The transfer of responsibility began with the initial system charging phase whereupon completion the power source shut down. These actions leave positive holes throughout field plate 4 and receiver plate 18. Thus leaving plate 18 now poised to attract and seize electrons from the medium. Valve 28 prevents the return of electrons to plate 18. In turn the attracted and seized electrons of the medium are then transferred to the isolation plate 12. Through the function of induction plate 10, a positive charge is induced on isolation plate 12. The seized electrons of the medium are simultaneously attracted by the positive holes that permeate the isolation plate 12 causing the particles to move through valve 22, where they are prevented from returning to field plate 4. These interactions establish a continuous flow of electrons from the medium to the craft's electrical system. Considering that the isolation plate represents any number that may be required, a substantial quantity of energy can amass over very short periods of time. The energy is thus immediately available for use in a variety of applications. As can be seen, by maintaining the respective electric charge upon the negative field plate 6 and the positive induction plate 10 and exposing the electron receiver plate 18 to the medium, a continuous supply of electric energy is produced and made ready for use in all onboard systems. Additionally, the process functions as described above in FIG. 1A.

Figure 3A:
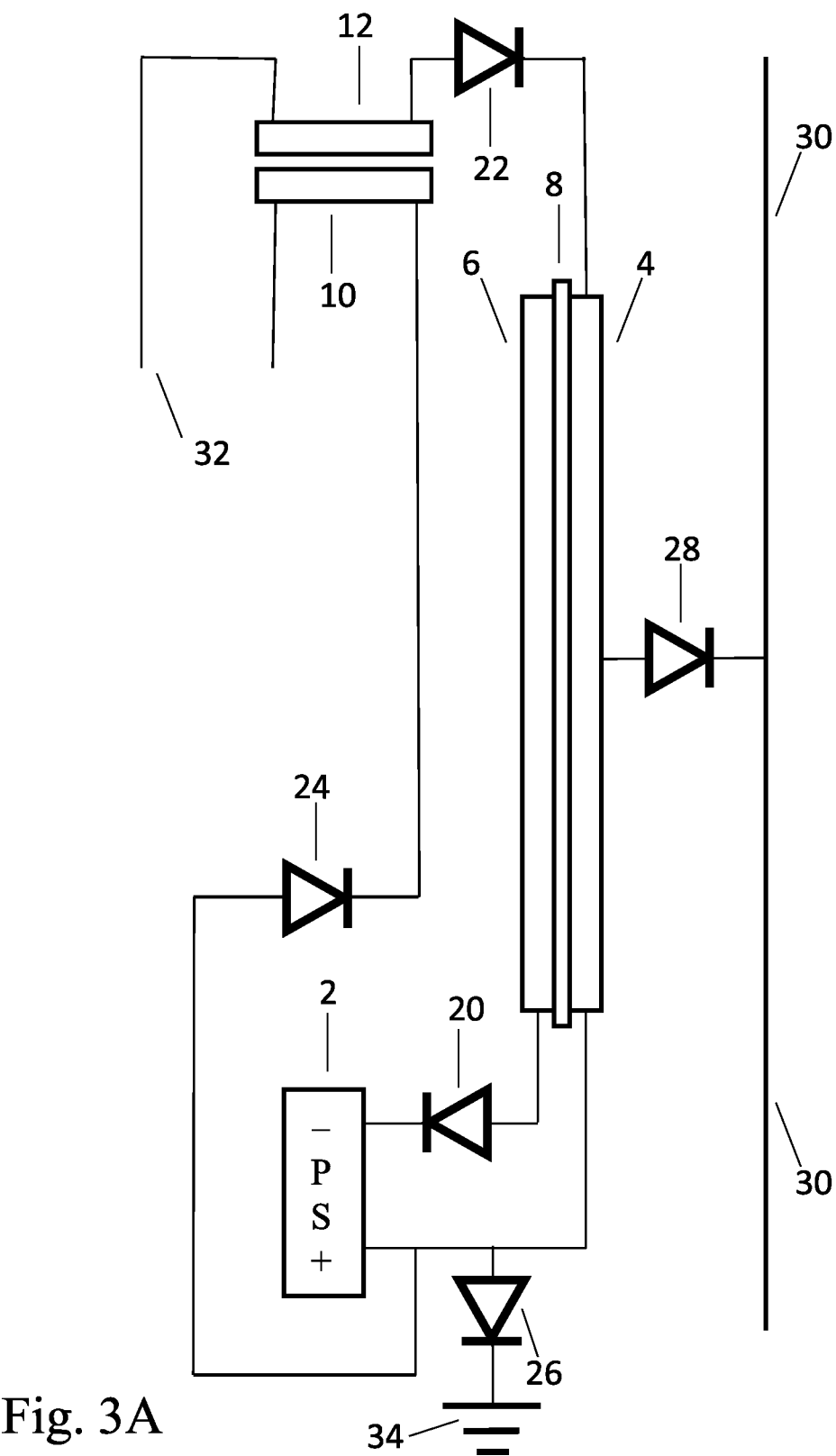
FIG. 3A shows another variation of an embodiment containing an alternate electron interception and deflection terminal consisting of the exterior enclosure 30 of the craft connected directly to field plate 4 with an adjoining fifth valve.

However, while receiver plate 18 is exposed to the medium, it also functions as the deflection terminal that diverts positive electric charges from its surface. If the surface of the craft had one or more deflection terminals 18, positively charged particles would be deflected from them. Thus, the surface could be covered by separate deflection plates with groups thereof powered by a dedicated solar power source of the type described herein. As an alternative, each deflection plate could be powered by an individual solar power source. Furthermore, the deflection terminal 18 could be connected to the exterior surface 30, as shown in the FIG. 2A and establish a positive electric charge on the entire surface of the craft. In some embodiments it might be preferable to bypass terminal 18 and connect the exterior surface 30 directly to the field plate 4, as shown in FIG. 3A and or connect to isolation plate 12. Any excess electrons seized can be discharged into space with a suitable terminal. Increasing the quantity of electron isolation units consisting of parts 10 and 12 will accelerate electron removal from plate 4, terminal 18 and or the exterior surface 30. This will maintain the positive electric charges of those components.

DESCRIPTION

FIG. 3A

FIG. 3A shows another variation of the basic components of an embodiment coupled with a schematic diagram indicating their relative position within an electronic circuit. The components include a power source 2 with the negative terminal connected to the negative field plate 6, while the positive terminal is connected to the positive field plate 4. The parts 6 and 4 are in fact the negative and positive plates of a charge segregation and storage assembly, respectively. This figure differs from the previous by the exclusion of an electron receiver plate 18, which functioned as the electron interception terminal. In this figure the responsibility has been transferred to the exterior surface 30, which now functions as the both the receiver plate and the deflection surface. It connects through valve 28 directly to field plate 4.

As shown, the positive field plate 4 is connected to the power source 2 and through valve 20 to the negative field plate 6. The valve 20 isolates the transferred electrons on the negative field plate 6 and prevents the return of electrons to the positive field plate 4 and other components. All valves shown are represented by diodes although other types of valves can be used. The positive induction plate 10 also connects to the power source 2. Just as with the positive field plate 4, when the power source is activated, electrons are removed from the positive induction plate 10 and transferred to the negative field plate 6. The positive charge established there on plate 10 initiates a series of events that take place within the opposite electron isolation plate 12. This relationship establishes positive holes throughout the latter side of plate 12. Although a single electron isolation assembly is shown consisting of parts 10 and 12, it is representative of a group consisting of any quantity that may be required by an implementation. The electrons attracted to and consolidated on the backside of the isolation plate 12 can now be distributed as electricity to many devices directly or put to use as may be necessary throughout the spacecraft. This figure also demonstrates a negative terminal 32, which connects to the craft's electrical system. The positive ground 34 is also shown here connected through valve 26. In this embodiment the positive field plate 4 no longer functions as the primary electron interception terminal. This function has been transferred to the exterior surface 30 as the primary interception terminal. Through valve 28, the field plate 4 and the exterior surface 30 are connected. The entire surface of the craft now functions as the interception terminal and as the deflection terminal. This figure differs from the previous by the exclusion of the receiver plate 18.

OPERATION

FIG. 3A

The basic operation of FIG. 3A is similar as that of the previous figures. From the perspective shown, electrons are removed from field plate 4 through the power source 2 and transferred to field plate 6. However, in this embodiment field plate 4 no longer functions as the electron interception terminal. This responsibility has been transferred to the exterior wall 30 by which free electrons from the medium source will be attracted and seized. With the exterior wall 30 connected through valve 28 to the positive field plate 4, resident valance electrons are removed from the wall 30, transferred to field plate 4 and then to field plate 6. The transfer of responsibility began with the initial system charging phase whereupon completion the power source shut down. These actions leave positive holes throughout field plate 4 and exterior wall 30. Thus leaving the exterior surface 30 now poised to attract and seize electrons from the medium. Valve 28 prevents the return of electrons to wall 30. In turn the attracted and seized electrons of the medium are then transferred to the isolation plate 12. Through the function of induction plate 10, a positive charge is induced on isolation plate 12. The seized electrons of the medium are simultaneously attracted by the positive holes that permeate the isolation plate 12 causing the particles to move through valve 22, where they are prevented from returning to field plate 4. These interactions establish a continuous flow of electrons from the medium to the craft's electrical system.

Considering that the isolation plate 12 represents any number that may be required, a substantial quantity of energy can amass over very short periods of time. The energy is thus immediately available for use in a variety of applications. As can be seen, by maintaining the respective electric charge upon the negative field plate 6 and the positive induction plate 10 and exposing the craft to the medium, a continuous supply of electric energy is produced and made ready for use in all onboard systems.

However, while the craft is exposed to the medium, its exterior surface also functions as the deflection terminal 30 that diverts positive electric charges from its surface. The surface could be separated into sections with groups thereof powered by a dedicated solar power source of the type described herein. As an alternative, each surface section could be powered by an individual solar power source. As shown, the exterior surface 30 connects directly to the field plate 4, as shown in FIG. 3A. Any excess electrons seized can be discharged into space with a suitable terminal. Increasing the quantity of electron isolation units consisting of parts 10 and 12 will accelerate electron removal from plate 4 and the exterior surface 30. This will maintain the positive electric charges of those components. Additionally, the process functions as described above in FIGS. 1A and 2A.

DESCRIPTION

FIG. 4A

Figure 4A:
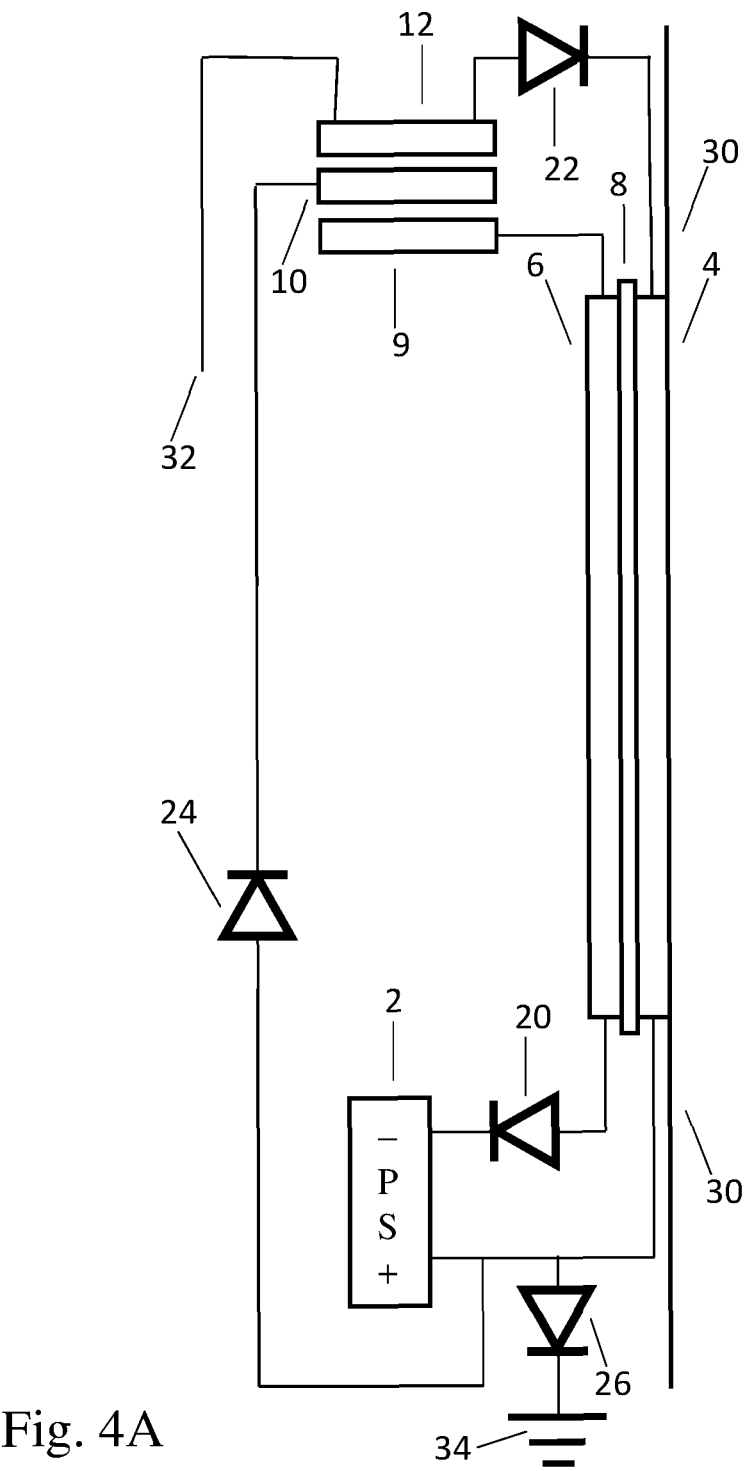
FIG. 4A depicts a schematic view of a disclosed embodiment that includes a negative induction plate (9)

FIG. 4A shows another variation of the basic components of an embodiment coupled with a schematic diagram indicating their relative position within an electronic circuit. The components include a power source 2 with the negative terminal connected to the negative field plate 6, while the positive terminal is connected to the positive field plate 4. The parts 6 and 4 are in fact the negative and positive plates of a charge segregation and storage assembly, respectively. This figure differs from the previous by the addition of the negative induction plate 9.

As shown, the positive field plate 4 is connected to the power source 2 and through valve 20 to the negative field plate 6. The valve isolates the transferred electrons on the negative field plate 6 and prevents the return of electrons to the positive field plate 4 and other components. All valves shown are represented by diodes although many types of valves can be used. The positive induction plate 10 also connects to the power source 2. Just as with the positive field plate 4, when the power source is activated, electrons are removed from the positive induction plate 10 and transferred to the negative field plate 6 and the negative induction plate 9. The positive charge established there on plate 10 initiates a series of events that take place within the opposite electron isolation plate 12. The interactions establish positive holes throughout the latter side of plate 12. These events contribute to the attraction, capture and isolation of solar electrons. Although a single modified electron isolation assembly is shown consisting of parts 9, 10 and 12, it is representative of a group consisting of any quantity that may be required by an implementation. The solar electrons attracted to and consolidated on the backside of the isolation plate 12 can now be distributed as electricity to many devices directly or put to use as may be necessary throughout the spacecraft. This figure also demonstrates a negative terminal 32 which connects to the electrical system of the craft; these configurations could be arranged differently or reversed in some embodiments. In this embodiment the positive field plate 4 functions as the primary electron interception terminal located at a convenient position on or within the craft so as to be exposed to the free electrons of the medium. This figure differs from the previous by the addition of the negative induction plate 9, shown connected to the negative field plate 6. However, the negative induction plate 9 and the positive induction plate 10 could bypass field plate 6 and connect to another power supply or source. The addition of induction plate 9 demonstrates another method to place a positive charge on the positive induction plate 10.

OPERATION

FIG. 4A

The basic operation of FIG. 4A is similar as that of the previous figure. From the perspective shown, electrons are removed from field plate 4 through the power source 2 and transferred to field plate 6. This action leaves positive holes throughout field plate 4, which functions as the electron interception terminal by which solar electrons from the medium source are attracted and seized. In this embodiment, a modified electron isolation assembly consisting of the negative induction plate 9, the positive induction plate 10 and the electron isolation plate 12 is introduced. The assemblage of the three parts modifies the electron isolation assembly into a highly adjustable component having a broad range. As can be seen, during the initial system charging phase, the plates 9 and 10 are charged by removing electrons from plate 10 and transferring them to plate 9. Through the interaction of the negative induction plate 9 with the positive induction plate 10, a positive charge is induced on isolation plate 12. The free electrons of the medium are simultaneously attracted by the positive holes that permeate the isolation plate 12 causing the particles to move through valve 22, where they are prevented from returning to field plate 4 or the medium. These interactions establish a continuous flow of electrons from the medium to the craft's electrical system. It should be noted that plate 9 could bypass connection to the field plate 6 and connect directly to the power source 2 or another power source. Considering that the modified electron isolation assembly represents any number that may be required, a substantial quantity of energy can amass over very short periods of time. The energy is thus immediately and directly available for use in a variety of applications. As can be seen, by maintaining the respective electric charge upon the negative field plate 6 and the positive induction plate 10 and exposing the interception terminal 4 of the embodiment to the medium, a continuous supply of electric energy is produced and made ready for use by all onboard systems. This figure differs from the previous with a modified electron isolation assembly by the addition of the negative induction plate 9, which is shown connected to the negative field plate 6. Additionally, the process functions as described above in FIGS. 1A, 2A, 3A and 4A.

In another embodiment, the exterior wall 30 could take the place of the positive field plate 4 and in conjunction with negative field plate 6, become the charge segregation assembly. In other words, the entire surface could become the positive field plate.

Covering portholes and observation windows with a fine mesh screen connected to the positive field plate 4 will maintain visibility and provide protective capabilities against positively charged particle impacts.

It should also be understood that subject to the requirements of a specific embodiment or implementation, common electronic components or circuitry that may not be expressly shown in the figures are nevertheless represented by necessity, within the written description, or as part of the block components.

In FIGS. 1A, 2A, 3A and 4A, single components are shown in the various positions, however, it should be understood that they represent one or more components or groups of components, or any number that may be required by an implementation. For wherever one component is shown, it represents one or more component units, or groups of units, or any number that may be required by an implementation.

As previously stated, the figures show the components and their relative position within an electronic circuit, however, the actual style, shape, size, value, configuration, design, specification and quantity of each part is determined by its final execution and relation to adjoining parts and components of the utilization.

It should be noted that although in the various embodiments four and five valves are shown, they are representative of a group consisting of any quantity that may be required at any specific position or throughout the circuitry of an implementation. In some instances, transistors can be used throughout the circuitry of an implementation. And in some implementations fewer than four valves might be sufficient, where in some applications, just two valves are required.

As can be seen, by maintaining the respective electric charge upon the negative field plate 6, the positive field plate 4 and the positive induction plate 10 and placing a positively charged component of the embodiment exposed to the medium of the heliosphere, a continuous supply of electric energy is produced and made ready for use in a variety of systems throughout the craft. The stated conditions allow the deflection of cosmic ray and solar wind protons, positive ions and nuclei.

It is noted here that other electric power generation systems could be substituted for that described herein and applied to the technology of the present application, provided the system is suitable with having the capacity for all requirements.

It should be also noted that some components shown in individual figures may not be specifically shown in every figure. This was done either to simplify the explanation of operation of an embodiment, to highlight other features of different embodiments shown in the figures or to demonstrate the functionality of an embodiment with the component in place or when the component was excluded.

Alternative Embodiments

Although the descriptions above show and discuss many alternative embodiments, they should not be interpreted as to limit the scope of the embodiments, as they are representations of only a small number of potential embodiments. Furthermore, the principal components of any embodiment may be arranged differently and the components may take on different values, shapes, configurations, specifications and quantities from that shown or described herein.

ADVANTAGES

By utilizing the process of the present application, it is no longer necessary for spacecraft, its payload or occupants to suffer the consequences of impacts and surface penetration by low and high energy particles of cosmic rays and solar wind. Furthermore, spacecraft will not need to carry large quantities of chemicals for batteries, fuels and oxidizers for fuel cell generators, hazardous nuclear generators or large bulky photovoltaic panels with complicated unfolding mechanisms that are subject to frequent malfunction. The features of the subject process make each spacecraft independent from domestic energy sources. In terms of energy production, the subject process will outperform all of the traditional systems described above including photovoltaic panels. The application describes two innovative processes for the production of electric energy by the attraction and seizure of electrons emitted through the Sun's corona. The second is the deflection of high-energy particles. Because one process captures electrons directly from solar wind emissions, it does not consume power to convert one form of energy into another. It functions continuously throughout and beyond the heliosphere. It can be scaled to accommodate the electric power requirements of all spacecraft, including satellites and space stations. The process will accommodate the electric needs of base stations and surface vehicles situated on various moons throughout the solar system including the planets Mercury and Mars. It is adaptable to many other implementations and utilizations. Some of the terms that describe the advantages of the process of the present application are simplicity, efficiency, adaptability, versatility, low energy consumption, and high productivity. Additionally, one process utilizes solar emissions to provide sufficient energy to deflect particles that will cause irreversible damage to the craft and its occupants

CONCLUSION, RAMIFICATIONS AND SCOPE

Accordingly, the reader will see that the process of the present application is superior to all prior art for the diversion and deflection of positively charged particles and the seizure of electrons from solar wind and other emission sources for the production of electricity for spacecraft.

As has been demonstrated here, the present application describes the first pragmatic process capable of shielding spacecraft and occupants from destructive impact and penetration of the crafts' exterior walls by positively charged particles of cosmic rays and solar wind. The technology also protects the craft from the prospect of internal secondary radiation caused by high-energy particles that strike the surface and those that penetrate to the interior. This process is powered by the seizure of electrons and beta-minus particles emitted by the sun. The electrons that permeate the space above the planet's atmosphere are not particles bound to any atom or molecule, hence, electron binding energy is not a factor in their seizure. Since, the electrons are free and independent particles, already moving towards any craft situated out there, no energy is necessary to attract them to the craft. To maintain a constant supply of electrons for the craft's electrical system, the subject process provides a series of components that are advantageously organized for the seizure, isolation and sequestration of beta-minus particles and electrons present in various outer space environments.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventor contemplate the various aspects of the invention in any number of claim forms.

What is claimed is:

1. A system for diverting and deflecting energetic positively charged particles of cosmic rays and solar wind from impacting upon and penetrating an exterior surface of a structure and to abate the occurrences of secondary cascading ionization radiation within the structure through the application and maintenance of a positive electric charge to the exterior of the structure, wherein the structure is located above and beyond the Earth's atmosphere and wherein the system produces energy by the attraction and seizure of free negatively charged electrons and beta minus particles that permeate the medium of space, the system comprising:

a. a positively charged exterior surface of the structure functions as a deflection terminal and is exposed to the medium of space whereupon positively charged cosmic ray and solar wind particles are diverted and deflected from the positively charged exterior surface;

b. the positively charged exterior surface also functions as an interception terminal exposed to the medium of space wherewith free electrons and beta-minus particles are seized;

c. the positively charged exterior surface also acts as a first field plate (4) that connects to a positive terminal of an electric power source (2) and gives up electrons to a second field plate (6) connected to a negative terminal of power source (2) having an electric potential difference;

d. the second field plate (6) having a surplus of electrons is isolated from the environment and the first field plate (4);

e. a negatively charged inner surface of the second field plate, (6), is separated from the first field plate (4), by a non-conductive substance (8);

f. the positively charged first field plate (4), is attached by conductor to second one-way valve (22), and the second one-way valve connects to an isolation plate (12);

g. the positive charge on the first field plate (4) is maintained by attraction of seized electrons to isolation plate (12);

h. the migration of electrons to the facing surface of the isolation plate (12), induces a positive electric charge comprising positive holes upon portions of the isolation plate (12); and i. the isolation plate (12) attracts and isolates electrons and beta-minus particles seized from the medium of space and provides electricity to any load circuit placed between negative terminal (32) and positive ground terminal (34);

wherein the system is configured to produce useable energy, wherein the system is further configured to operate in space and not in atmosphere.

2. The system of claim 1 wherein a deflection surface terminal (30) is attached to a first one-way valve (28) and the first one-way valve (28) is attached to an outer side of the first field pate (4).

3. The system of claim 2 wherein the deflection surface terminal (30) is attached to an electron receiver plate (18) and the electron receiver plate is attached to the first one-way valve (28), and the first one way valve (28) connects to the outer surface of the first field plate (4).

4. The system of claim 1 wherein the first field plate (4) covers an entire vehicle.

5. The system of claim 1 wherein a negative induction plate (9) is connected to the second field plate (6).

6. The system of claim 5 wherein by incorporating the negative induction plate (9) with positive induction plate (10), through an electric potential difference, a positive charge is placed on induction plate (10) and a charge control can be established over isolation plate (12).

7. The system of claim 1 wherein the first field plate (4) covers an entire outer structure.

8. The system of claim 1 wherein the first field plate (4) is used as the exterior outer structure.

* * * * *